US006377213B1

United States Patent
Odachi et al.

(10) Patent No.: US 6,377,213 B1
(45) Date of Patent: Apr. 23, 2002

(54) WAVE ARRIVAL DIRECTION ESTIMATING METHOD AND ANTENNA APPARATUS HAVING WAVE ARRIVAL DIRECTION ESTIMATING FUNCTION

(75) Inventors: Noriaki Odachi, Yokohama; Hiroki Shoki, Kawasaki, both of (JP)

(73) Assignee: Bushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/472,809

(22) Filed: Dec. 28, 1999

(30) Foreign Application Priority Data

Dec. 28, 1998 (JP) ............................................ 10-372740

(51) Int. Cl.⁷ ................................................. G01S 3/16
(52) U.S. Cl. ........................ 342/383; 342/372; 342/373
(58) Field of Search ................................. 342/380, 383, 342/372, 373, 374

(56) References Cited

U.S. PATENT DOCUMENTS

| 4,316,191 A | * | 2/1982 | Sawatari et al. | |
| 5,504,490 A | | 4/1996 | Brendle et al. | |
| 5,940,029 A | * | 8/1999 | Ninomiya et al. | 342/372 |
| 6,087,986 A | * | 7/2000 | Shoki et al. | 342/383 |

OTHER PUBLICATIONS

Ralph O. Schmidt, "Multiple Emitter Location and Signal Parameter Estimation," IEEE Transactions on Antennas and Propagation, vol. AP-34, No. 3, (Mar. 1986), pp. 276–280.

Harry B. Lee, et al., "Resolution Threshold of Beamspace Music for Two Closely Spaced Emitters," IEEE Transactions on Acoustics, Speech, and Signal Processing, vol. 38, No. 9, (Sep. 1990), pp. 1545–1559.

* cited by examiner

Primary Examiner—Theodore M. Blum
(74) Attorney, Agent, or Firm—Oblon, Spivak, McClelland, Maier & Neustadt, P.C.

(57) ABSTRACT

A method for estimating an arrival direction of an electromagnetic wave by the BS-MUSIC, by inputting into one receiver arrival wave reception signals received by a plurality of antenna elements constituting an array antenna. At first, a wide range is scanned in a plurality of directions with a wide antenna beam and a first estimation of arrival direction is carried out. Next, a plurality of directions are scanned with a narrow antenna beam to cover only the directions obtained as a result of the first estimation of arrival direction. Thus, a second estimation of arrival direction is carried out. With this arrangement, it is possible to provide a method of estimating an arrival direction by using a small number of receivers in a small apparatus at low cost. Further, based on this method, it is also possible to estimate an arrival direction in a small calculation volume even under the unknown environment of waves.

22 Claims, 8 Drawing Sheets

WAVE ARRIVAL DIRECTION ESTIMATING METHOD AND ANTENNA APPARATUS HAVING WAVE ARRIVAL DIRECTION ESTIMATING FUNCTION

BACKGROUND OF THE INVENTION

The present invention relates to a wave arrival direction estimating method and an antenna apparatus having a wave arrival direction estimating function, to be applied to a radar, a mobile communication base station, and the like.

This application is based on Japanese Patent Application No. 10-372740, filed Dec. 28, 1998, the entire content of which is incorporated herein by reference.

A technique of estimating a wave arrival direction has been used for various kinds of controls, such as, for example, a tracing of a flying object or a detecting of its arrival direction by radar, a control of directing a beam pattern to a specific mobile station or, on the contrary, not directing a beam pattern to a specific mobile station, from an antenna at a base station of a mobile radio communication system, and a detection of an arrival direction of an interference wave and forming a null of a beam pattern to this direction, and the like.

Among such techniques for estimating a wave arrival direction, there has been known MUSIC (Multiple Signal Classification) method, particularly as a high-resolution estimating technique capable of simultaneously estimating arrival directions of a plurality of waves of the same frequency. Details of this MUSIC are described in R. O. Schmit, "Multiple Emitter Location and Signal Parameter Estimation", IEEE Trans. Antennas and Propagation, vol. AP-34, no. 3, pp. 276–280, March, 1986 (Document 1).

The MUSIC is an algorithm for estimating wave arrival directions by the following processes. At first, high-frequency signals output from antenna elements constituting an array antenna are input to receivers. Then, a covariance matrix of reception signals from the receiver is obtained, and an eigen value and an eigen vector of this matrix are calculated. By comparing sizes of the eigen value and noise power, the eigen vector is divided into a signal subspace and a noise subspace. Wave arrival directions are estimated by utilizing the orthogonality of the signal subspace and the noise subspace. This method is characterized in that the method is generally called a high-resolution method as the wave arrival direction is estimated by utilizing the null of the beam pattern, and that it is possible to simultaneously estimate directions of arrival waves by the number of "the number of antenna elements minus one".

However, according to the MUSIC, in order to simultaneously estimate the directions of a plurality of arrival waves, it is necessary to prepare receivers for receiving and demodulating high-frequency signals output from the antenna elements to obtain reception signals by the number of antenna elements. For example, in the case of applying the MUSIC under a propagation environment where the number of arrival waves is unknown, it is necessary to prepare a sufficient number of antenna elements. Accordingly, it is also necessary to provide receivers by the same number as that of the antenna elements. As a result, the size of a wave arrival direction estimating apparatus becomes large, leading to a higher cost of the apparatus.

When the number of the antenna elements increases, the order of the covariance matrix to be used for estimating the wave arrival directions becomes larger. As the covariance matrix is obtained from an average of a large number of reception signals, the volume of data becomes larger and it also takes a long processing time. Further, when the order of the matrix becomes larger at the time of calculating the eigen value of this covariance matrix, the time required for the calculation increases in proportion to the cube of the order. Taking a long time for the calculation becomes a serious problem particularly in the case of estimating the wave arrival direction in on-line processing.

As means for solving the above-described problems of the MUSIC, there have already been proposed the following two techniques.

A first method provides the following processing. As shown in FIG. 1, a high-frequency switch 202 sequentially selects high-frequency signals output from antenna elements 201. Only one high-frequency signal is input to one receiver 203 at one time. A reception signal from the receiver 203 is guided to an arrival direction estimation circuit 204, and a calculation similar to that of the MUSIC is carried out. Details of this method are described in SEKIZAWA, "Development of Linear Array Antenna for Estimating Arrival Directions of Multiple-waves", Singaku-Giho, RCS96-128, pp. 7–14, January, 1997 (Document 2).

According to this method, it is possible to provide a small apparatus at low cost, as only one receiver 203 is required. However, as the high-frequency signals output from the antenna elements 201 are sequentially demodulated in time series by the receiver 203, it is not possible to carry out a precise estimation of the arrival directions when the propagation environment has changed during this processing. Particularly, this problem becomes serious when the number of the antenna elements 201 increases. Further, according to this method, the calculation itself is basically similar to that of the MUSIC, and it is not possible to improve the processing time.

A second method is to use a technique called beam space MUSIC (hereinafter to be referred to as BS-MUSIC). Details of this BS-MUSIC are described in HARRY B. LEE and MICHAEL S. WENGROVITZ, "Resolution Threshold of Beamspace MUSIC For Two Closely Spaced Emitters", IEE Trans. Acoust. Speech and Signal Processing, vol. ASSP-38, no. 9, pp. 1545–1559, September, 1990 (Document 3).

The BS-MUSIC will be explained briefly with reference to FIG. 2. High-frequency signals output from antenna elements 211 are simultaneously input to a beam synthesis circuit 212, to form beams of a plurality of antennas. The high-frequency signals for the beams are sequentially received by a receiver 213, and a wave arrival direction is estimated by an arrival direction estimation circuit 214 based on the reception signals. The difference of algorithms between the MUSIC and the BS-MUSIC is that, according to the BS-MUSIC, a calculation expression includes a weight vector multiplied to a high-frequency signal from each antenna element 211 when an antenna beam has been formed. Basically, the calculation procedure is similar to that of the MUSIC. According to the BS-MUSIC, as shown in FIG. 2, only one receiver 213 is necessary in a similar manner to that of the method of the Document 2, and it is possible to provide a small apparatus at low cost.

However, according to the BS-MUSIC, the arrival waves from the directions to which the antenna beams are directed are received by main lobes of the beams, but the arrival waves from the directions to which the antenna beams are not directed are received by side lobes of the beams. This means that the arrival waves received by the side lobes are not substantially received. In other words, while it is possible to estimate the wave arrival directions for the waves to which the beams are directed by the beam synthesis circuit 212, it is not possible to estimate the wave arrival direction for the waves to which the beams are not directed. However, in the case of applying the BS-MUSIC under the unknown propagation environment, it is necessary to direct antenna beams to all directions in order to estimate the an arrival direction of the wave from all directions. Further, the number of arrival waves that can be separated in the BS-MUSIC is "the number of beams formed by the beam synthesis circuit minus one", and this number also has a limitation like that of the MUSIC.

Accordingly, in order to carry out a precise estimation of wave arrival direction in the BS-MUSIC under the environment having a potential of existence of a large number of arrival waves, it is necessary to form a large number of antenna beams by using a large number of antenna elements assuming a large number of arrivals of waves. Thus, it is not possible to solve the second problem that it takes a long processing time.

As described above, according to the wave arrival direction estimating technique using the prior-art MUSIC method, a large number of receivers are necessary, which has a problem of an increase in the size of the arrival direction estimating apparatus, leading to an increase in the cost of the apparatus. Further, when a large number of antenna elements are used in order to precisely estimate wave arrival direction under the propagation environment where the number of arrival waves is unknown, it takes a long time for the calculation, making it possible to carry out an on-line processing.

Further, according to the BS-MUSIC technique requiring only one receiver through the improvement of the MUSIC technique, as disclosed in FIG. 1 and FIG. 2, it is also necessary to use a large number of antenna elements for precisely estimating wave arrival direction under the environment with a potential of existence of a large number of arrival waves. Thus, it is not possible to solve the problem that it takes a long processing time.

BRIEF SUMMARY OF THE INVENTION

The present invention has been made to cope with the above-described situation, and it is an object of the invention to provide a wave arrival direction estimating method capable of providing a compact and low-cost wave direction estimating apparatus with a small number of receivers and capable of estimating arrival direction in a small volume of calculation even under the unknown environment of waves.

It is another object of the present invention to provide an antenna apparatus having a wave arrival direction estimating function according to the above estimating method.

In order to achieve the above objects, in a first aspect of the present invention, there is provided a wave arrival direction estimating method for receiving an arrival wave with a plurality of antenna elements arrayed in a predetermined manner, inputting high-frequency signals obtained by this reception into one receiver, and estimating an arrival direction of the wave from reception signals generated, wherein the arrival direction estimating method includes a first arrival direction estimation wherein a first wide antenna beam is formed and radiated by a plurality of times in plural directions, and a second arrival direction estimation wherein a second antenna beam with a smaller width than the first antenna beam is formed and radiated by a plurality of times in directions of a result of the first arrival direction estimation.

In other words, in the first arrival direction estimation, a rough estimation is carried out by using the wide antenna beams radiated in plural directions. In the second arrival direction estimation, an antenna beam with a smaller beam width is formed by plural times and radiated in the directions of a result of estimation by the first arrival direction estimation, thereby to carry out a precise estimation.

According to the wave arrival direction estimating method of the above first aspect of the invention, it is possible to estimate an arrival direction in a relatively simple hardware configuration using one receiver and in a small volume of calculation even under the unknown environment of waves. For example, in the BS-MUSIC, it is possible to estimate an arrival direction by using a small number of data and a small matrix.

According to a second aspect of the invention, there is provided an antenna apparatus having a wave arrival direction estimating function according to the present invention, the antenna apparatus including a plurality of antenna elements arranged in a predetermined array which receives an arrival wave and outputting high-frequency signals, a plurality of phase shifters which individually phase-shifts high-frequency signals output from the plurality of antenna elements, a selector which selects antenna elements for receiving the arrival wave from the plurality of antenna elements, a signal synthesis circuit which synthesizes high-frequency signals phase-shifted by the phase shifters and sent from the antenna elements selected by the selector, a receiver which receives high-frequency signals output from the signal synthesis circuit and for generating reception signals, an arrival direction estimation circuit for estimating an arrival direction of the wave based on the reception signals, and a controller for controlling phase shift quantities of the phase shifters and a selection by the selector.

Further in a third aspect of the invention, there is provided another antenna apparatus having a wave arrival direction estimating function according to the present invention, the antenna apparatus being structured by using a reflection-type phased array antenna, and including a plurality of antenna elements arranged in a predetermined array, which receives an arrival wave and outputs high-frequency signals, a plurality of phase shifters for individually phase-shifting high-frequency signals output from the plurality of antenna elements, a reflector which selectively reflects some of the high-frequency signals phase-shifted by the phase shifters, thereby to re-transmit some of the signals as waves from the antenna elements, a primary emission antenna for receiving waves re-transmitted from the antenna elements and for outputting high-frequency signals, a receiver for receiving high-frequency signals output from the primary emission antenna and for generating reception signals, an arrival direction estimation circuit which estimates an arrival direction of the wave based on the reception signals, and a controller for controlling phase shift quantities of the phase shifters and a selection by the selector.

According to the antenna apparatuses of the second and third aspects of the invention, the arrival direction estimation circuit carries out a first estimation of arrival direction wherein a part of a plurality of antenna elements are selected by the selector and a predetermined number of antenna beams are sequentially formed by controlling the phase shift quantity of the phase shifters. Next, the arrival direction estimation circuit carries out a second estimation of arrival direction wherein all the plurality of antenna elements are selected by the selector and at least two antenna beams are sequentially formed by controlling the phase shift quantity of the phase shifters.

With this arrangement, it is possible to carry out a precise estimation of arrival direction in a relatively simple hardware configuration using one receiver and in a small volume of calculation even under the unknown environment of the wave.

In this case, in order to select antenna elements for receiving an arrival wave from the plurality of antenna elements, the selector consists of, for example, high-frequency switches of the same number as the antenna elements, or variable gain amplifiers of the same number as the antenna elements. The on/off of the high-frequency switches or the gain of the variable gain amplifiers is individually controlled by the controller.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of a wave arrival direction estimating method and an antenna apparatus having a wave arrival direction estimating function according to the present invention will now be described with reference to the accompanying drawings.

First Embodiment

Figure 1:
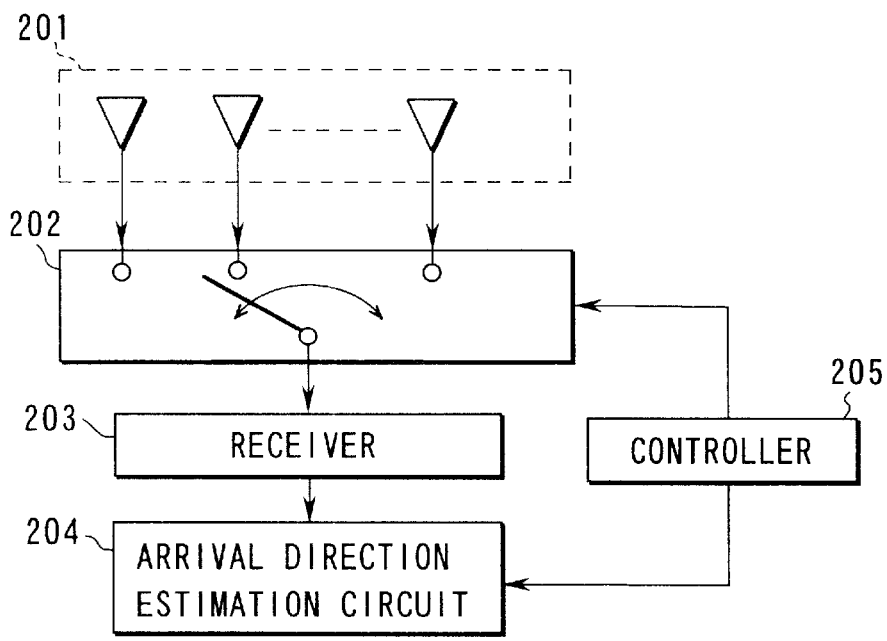
FIG. 1 is a block diagram showing a configuration of a prior-art antenna apparatus having a wave arrival direction estimating function.
Figure 2:
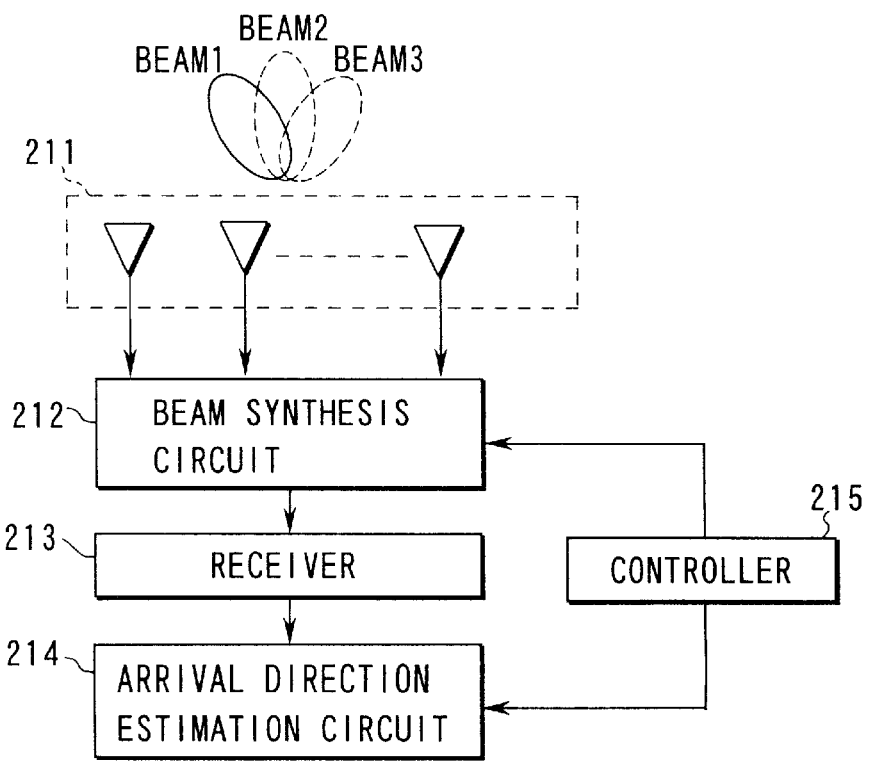
FIG. 2 is a block diagram showing a configuration of a prior-art antenna apparatus having a wave arrival direction estimating function using BS-MUSIC.
Figure 3:
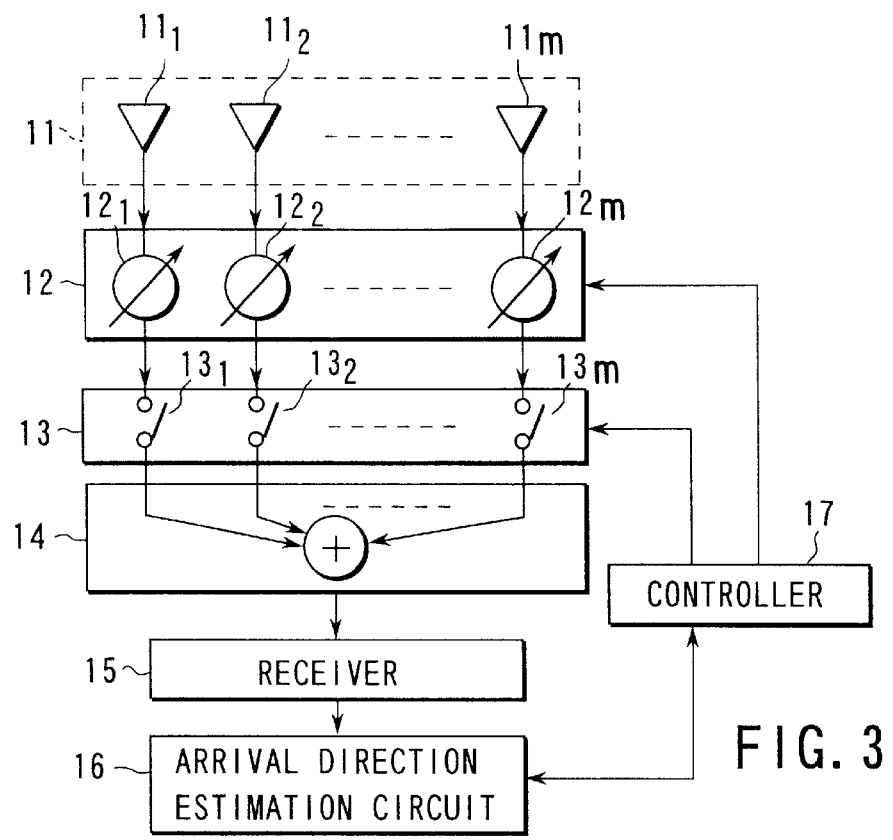
FIG. 3 is a block diagram showing a configuration of an antenna apparatus having a wave arrival direction estimating function according to a first embodiment of the present invention.

FIG. 3 is a diagram showing a configuration of an antenna apparatus having a wave arrival direction estimating function according to the first embodiment of the present invention. This antenna apparatus is structured by a plurality of antenna elements 111, 112, , 11m, a plurality of variable phase shifters 121, 122, . . . , 12m provided corresponding to the antenna elements 111, 112, . . . , 11m respectively, a plurality of high-frequency switches 131, 132, . . . , 13m provided at the output side of the variable phase shifters 121, 122, . . . , 12m respectively, a signal synthesis circuit 14, a receiver 15, an arrival direction estimation circuit 16, and a controller 17.

The antenna elements 111, 112, . . . , 11m are arranged in a predetermined array, such as, for example, in a linear one-row shape, to constitute an array antenna, for receiving a plurality of waves (arrival waves) of the same frequency. For the antenna elements 111, 112, . . . , 11m, there are used antenna elements having a relatively wide directivity, for example, a patch antenna, a monopole antenna, or the like. When the antenna elements of wide directivity are used, it is possible to receive arrival waves from a wide range of directions. Thus, it is possible to have a wide estimating range of wave arrivals.

The variable phase shifters 121, 122, . . . , 12m are connected to the antenna elements 111, 112, . . . , 11m individually, for shifting the high-frequency phases of high-frequency signals output from the corresponding antenna elements 111, 112, . . . , 11m. The phase-shift quantity is controlled by the controller 17.

Shifting the high-frequency signals is equivalent to changing the directivity of the array antenna 11 structured by the plurality of antenna elements 111, 112, . . . , 11m. It is possible to direct the antenna beams (directivity pattern) to a specific direction by controlling the phase shift quantity by the controller 17. In other words, shifting the phases of the high-frequency signals output from the antenna elements 111, 112, . . . , 11m is equivalent to receiving only waves arriving from the range of a certain specific direction.

The high-frequency signals phase-shifted by the variable phase shifters 121, 122, . . . , 12m are synthesized by a signal synthesis circuit 14 through the high-frequency switches 131, 132, . . . , 13m selectively on-and-off controlled by the controller 17. In other words, the high-frequency signals output from the variable phase shifters 121, 122, . . . , 12m are input to the signal synthesis circuit 14 when the corresponding high-frequency switches 131, 132, . . . , 13m are on, and these high-frequency signals are not input to the signal synthesis circuit 14 when the corresponding high-frequency switches 131, 132, . . . , 13m are off.

Accordingly, it is possible to change the number of the antenna elements 111, 112, . . . , 11m used for the signal reception, by selectively turning on/off the high-frequency switches 131, 132, . . . , 13m. With this arrangement, as explained in detail later, at first, it is possible to carry out a rough estimation of arrival direction by using a small number of the antenna elements 111, 112, . . . , 11m. Then, based on a result of this rough estimation, it is possible to carry out a precise estimation of arrival direction by using a large number of the antenna elements 111, 112, . . . , 11m, for example, by using all the antenna elements.

The outputs from the high-frequency switches 131, 132, . . . , 13m are input to the signal synthesis circuit 14. The signal synthesis circuit 14 synthesizes the input high-frequency signals into one signal based on respective predetermined phase relationships, for example, with a phase difference of zero. An output from this signal synthesis circuit 14 is demodulated by one receiver 15, thereby being output as a reception signal. From an output of this receiver 15, it is possible to estimate an arrival direction of waves arriving at the array antenna 11, based on a digital signal processing by the wave arrival direction estimation circuit 16.

The wave arrival direction estimation circuit 16 will be explained next.

For simplifying the explanation, the estimation of a wave arrival direction will be explained as a direction of one dimension (only azimuth). However, it is also possible to carry out the estimation of two-dimensional direction (azimuth plus elevation angle or wave angle) in a similar procedure.

Figure 4:
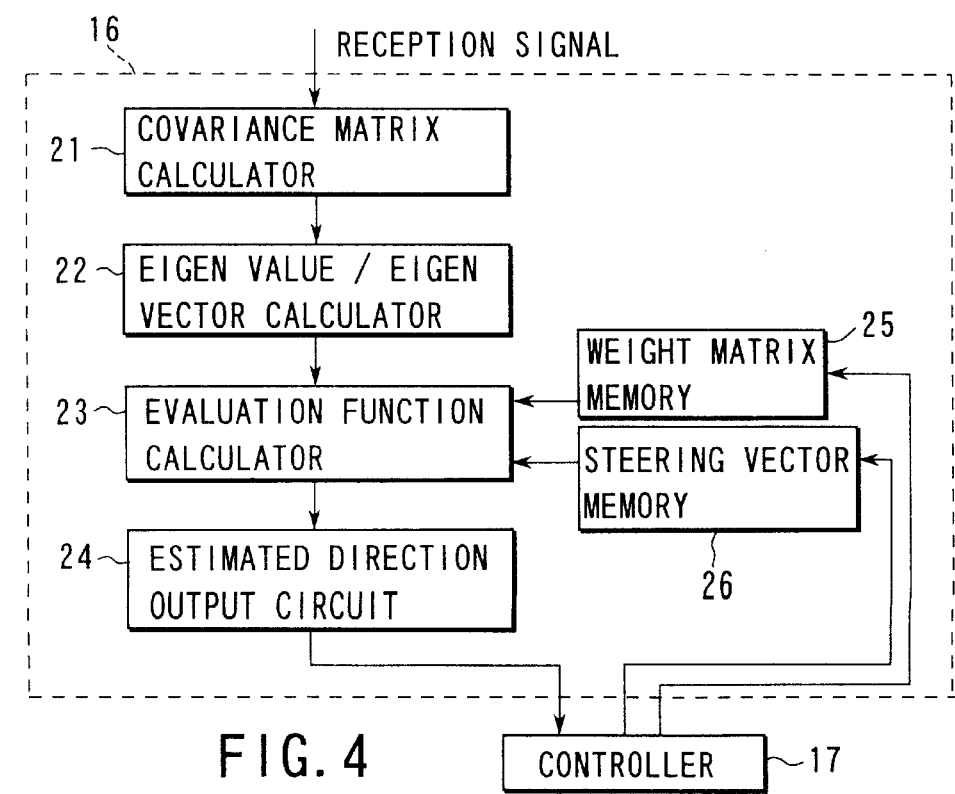
FIG. 4 is a block diagram showing a detailed configuration of an arrival direction estimation circuit in the first embodiment.

FIG. 4 shows a configuration of the wave arrival direction estimation circuit 16. The wave arrival direction estimation circuit 16 is structured by six blocks of a covariance matrix calculator 21, an eigen value/eigen vector calculator 22, an evaluation function calculator 23, a weight matrix memory 25, a steering vector memory 26, and an estimated direction output circuit 24. The flow of the processing based on the BS-MUSIC will be explained below.

At first, the controller 17 controls the variable phase shifters 121, 122, . . . , 12m and the high-frequency switches 131, 132, . . . , 13m. Assume that a reception signal from the receiver 15 in this case is x1. The controller 17 controls the variable phase shifters 121, 122, . . . , 12m and the high-frequency switches 131, 132, . . . , 13m again. Assume that a reception signal from the receiver 15 in this case is x2. The controller 17 repeats a similar operation by n times. In other words, reception signals (x1, x2, x3, . . . , xn) are obtained by n beam patterns.

The reception signals x1, x2, x3, . . . , xn obtained based on the n-time instructions from the controller 17 are expressed by a matrix of n rows and one column as follows.

$$X = \begin{bmatrix} x_1 \\ x_2 \\ x_{n-1} \\ x_n \end{bmatrix}$$

A covariance matrix obtained by the covariance matrix calculator 21 is expressed by the following expression.

$$S = E[XXH]$$

In this case, H denotes a conjugate complex transposition of X. In other words, the covariance matrix calculator 21 carries out a complex conjugation of each element of the matrix or vector, and further carries out a transposition of the matrix. To facilitate the explanation, the following relationship is obtained.

$$XH = [x1^*, x2^*, x3^*, \ldots, xn^*]$$

* denotes a complex conjugation.

Further, E[ ] means an average of sample values. The average of sample values means a time average in this case. In other words, X is sampled by the number of N in time series. Then, XXH is obtained by the number of N based on the above expression. More specifically, XXH is obtained as XXH (sample 1), XXH (sample 2), . . . , XXH (sample N). Last, all the N pieces of the XXH matrixes obtained are added up, and they are averaged. The average of the sample values (that is, E[ ]) is expressed as follows.

$$E[XXH] = (1/N) \times (XXH(\text{sample 1}) + XXH(\text{sample 2}) + \ldots + XXH(\text{sample } N))$$

In other words, the covariance matrix becomes a matrix of n rows and n columns.

From the above, the total number of the samples becomes N×n in the BS-MUSIC. Further, all the measuring must finish before the propagation environment has changed.

A matrix W to be stored in the weight matrix memory 25 will be explained next.

The phase shift quantity of the variable phase shifter 12 used for obtaining the reception signal x1 is expressed by the vector of the following expression.

$$w_1 = \begin{bmatrix} w_{11} \\ w_{12} \\ w_{1m-1} \\ w_{1m} \end{bmatrix}$$

The first one characters of the suffixes of w11, w12, . . . , w1m correspond respectively to the suffix 1 of x1. In other words, these correspond to the number of a beam. The latter one characters of the suffixes of w11, w12, , w1m correspond respectively to the numbers of antenna elements. In other words, these mean the antenna element 1 to the antenna element m, respectively. In this case, the number of the antenna elements is set m.

Similarly, the phase shift quantities of the variable phase shifter 12 used for obtaining the reception signal x2, . . . , xn are expressed as W2, W3, . . . , Wn.

The matrix W to be stored in the weight matrix memory 25 is given as follows.

$$W = [W1, W2, \ldots, Wn]$$

From the above, W is in the matrix of m rows and n columns.

Next, a minimum eigen value of a covariance matrix S and an eigen vector En corresponding to the minimum eigen value are calculated by the eigen value/eigen vector calculator 22. The eigen vector En is a matrix of n rows and one column (a column vector of a degree of n).

Next, an evaluation function PMU (θ) expressed by the following expression for each azimuth is calculated by the evaluation function calculator 23.

$$PMU(\theta)=(aH(\theta)(WEn)(WEn)Ha(\theta)/(aH(\theta)WW\,Ha(\theta))$$

In this case, a (θ) denotes a steering vector, and this is determined by the positions of the antenna elements 111, 112, ..., 11m and the mutual coupling of the antenna elements 111, 112, ..., 11m. This a (θ) is stored in advance in the steering vector memory 26. Also, the steering vector a (θ) is given as a function of θ. This a (θ) is a matrix of m rows and one column (a column vector).

The evaluation function PMU (θ) is calculated in the combination of the weight matrix W, the eigen vector En and the steering vector a (θ). Of these, the weight matrix W and the eigen vector En are given as constants. In other words, the evaluation function PMU (θ) is a function of θ (azimuth).

For estimating the azimuth, the evaluation function PMU (θ) is calculated while changing θ. During the calculation, there exists θ when the value of the evaluation function PMU (θ) suddenly shows a large value. At this time, this θ is set as a result of estimating the azimuth. Then, the estimated direction output circuit 24 outputs the result of estimating the arrival direction.

It is possible to estimate a wave arrival direction by the BS-MUSIC in the manner as described above.

Figure 5:
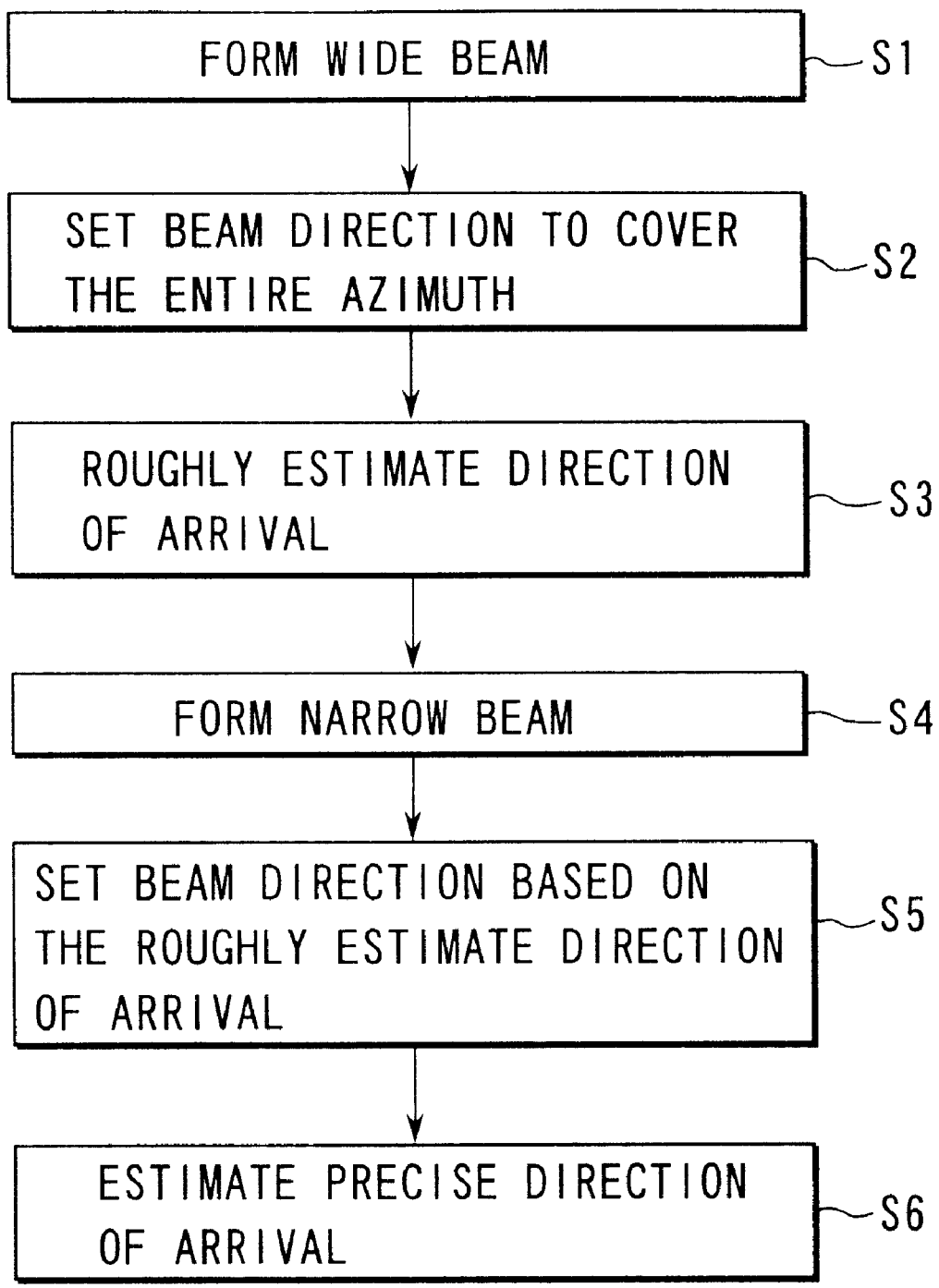
FIG. 5 is a flowchart for showing a procedure for estimating wave arrival direction according to the first embodiment.

Next, a wave arrival direction estimating procedure in the present embodiment will be explained by using a flowchart shown in FIG. 5.

In the present embodiment, at first, a first antenna beam of a wide beam width, that is, a first antenna beam of dull directivity, is formed by using only a part of the plurality of antenna elements 111, 112, ..., 11m constituting the array antenna (step S1). Then, the direction of the first antenna beam is scanned to cover the entire azimuth (step S2). Then, a wave arrival direction is roughly estimated at first by scanning the entire azimuth with the first antenna beam according to the BS-MUSIC (step S3).

Next, a second narrow antenna beam, that is, a second antenna beam of sharp directivity, is formed by using a larger number of antenna elements than those used for estimating the first arrival direction, for example, by using the whole antenna elements 111, 112, ..., 11m (step S4). Then, the direction of the second antenna beam (a scanning range) is determined based on the result of the first rough estimation of arrival direction (step S5). Based on the second antenna beam used for scanning the part of directions, the second arrival direction is estimated in detail according to the BS-MUSIC. Step S5 is a processing according to one rough estimated direction. When a plurality of directions are estimated at step S3, the operations of steps S5 and S6 are repeated in each estimated direction.

The above will be explained in more detail based on an example.

At first, as a model of the array antenna, the number of the antenna elements 111, 112, ..., 11m is set 32 (m=32). These antenna elements are arrayed linearly at half wavelength interval of an electromagnetic wave of which arrival direction is to be estimated. The antenna element 11 is assumed as a patch antenna, and the beam pattern of each antenna element is set as a cos θ pattern of which half beamwidth is 90°. Further, it is assumed that the number of a plurality of arrival waves is five, that the amplitudes of the arrival waves are equal, and that the wave arrival angles θ are 0°, +1°, +20°, −38°, and −40°, respectively.

In the first rough estimation of arrival direction, for example, only eight antenna elements of which positions are adjacent are used out of the 32 antenna elements 111, 112, ..., 1132. For example, the controller 17 controls so that only eight high-frequency switches 131, 132, ..., 138 corresponding to the eight antenna elements 111, 112, ..., 118 are turned on, and all the rest 24 high-frequency switches are turned off.

Figure 6:
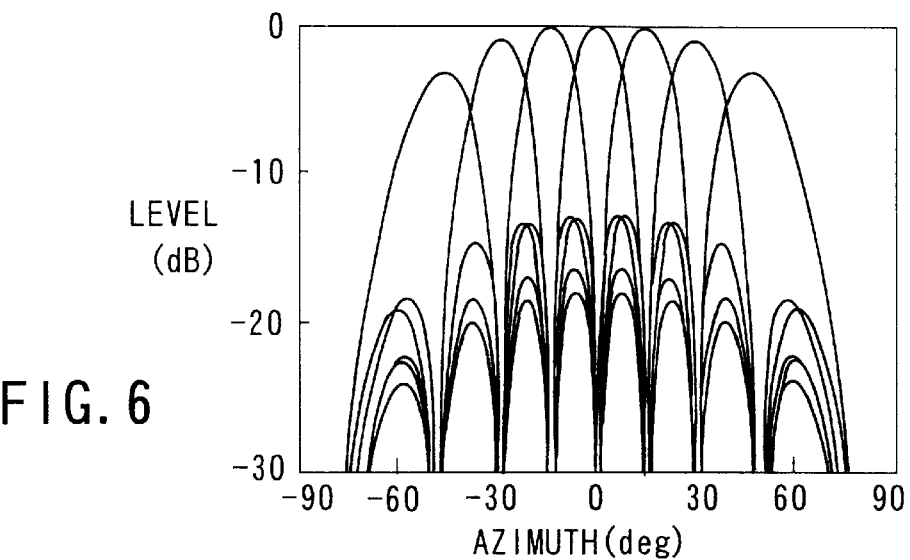
FIG. 6 is a diagram showing beam patterns of antenna beams to be used in a first estimation of arrival direction in the first embodiment.

Then, as shown in FIG. 6, phase shift quantities of the variable phase shifters 121, 122, ..., 128 are controlled by the controller 17, to scan an azimuth range of from about −75° to +75° with the first wide antenna beam by seven times. In other words, the first arrival direction is estimated by using the seven wide antenna beams.

Figure 7:
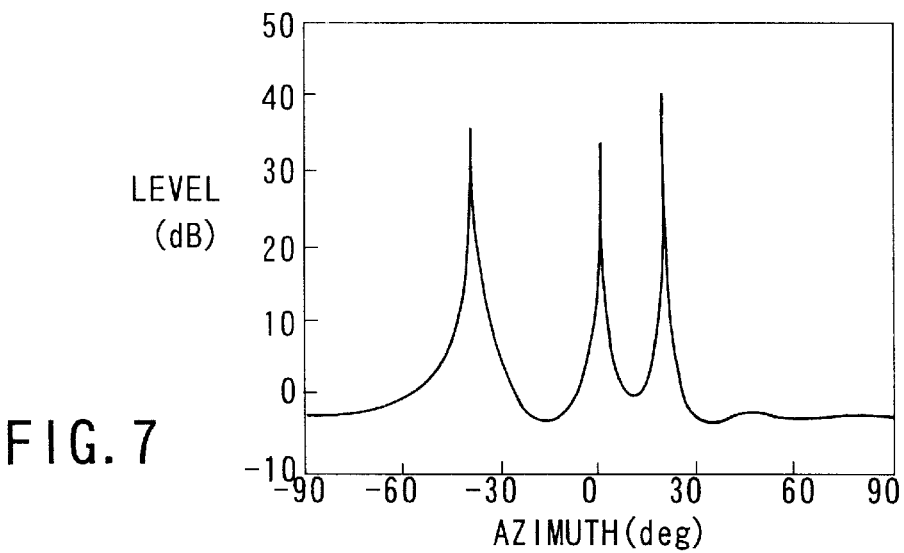
FIG. 7 is a diagram showing a result of an estimation by the first estimation of wave arrival direction when the beam patterns shown in FIG. 6 are used.

FIG. 7 shows a result of the estimating by this first arrival direction estimating operation. From FIG. 7, it is confirmed that there are three peaks and that three arrival waves exist. However, as the actual number of arrival waves is five, this estimate result is not correct. This error comes from a relatively small number of antenna elements used. As the eight elements are used in the first estimation of arrival direction, the antenna beams of the array antenna become relatively broader. As a result, two arrival waves coming from adjacent angles have been regarded as one same wave.

Although the arrival direction is not estimated accurately in the first estimation of arrival direction, the result of this estimation has peaks in the direction extremely near to the actual arrival waves, as shown in FIG. 7. In other words, it is known that rough arrival direction can be found by the first estimation of arrival direction.

Next, a second estimation of arrival direction is carried out in order to separate the plurality of wave arrival directions that have not been able to be clearly understood because of the duplication of the peaks in the first estimation. In order to precisely estimate the arrivals of a plurality of arrival waves by separating them when the arrival directions are close to each other, a second antenna beam of narrow beam width is used in the second estimation of arrival direction. In the present example, all of the 32 antenna elements 111, 112, ..., 1132 constituting the array antenna are used to carry out the second estimation of arrival direction.

Figure 8:
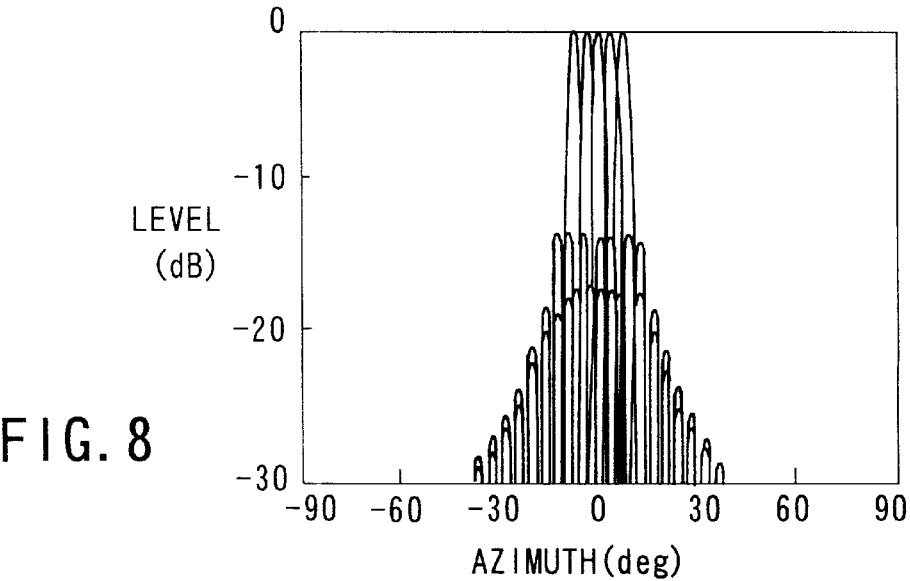
FIG. 8 is a diagram showing beam patterns of antenna beams to be used in a second estimation of arrival direction in the first embodiment.

As the arrival direction has been roughly estimated by the first estimation, only around these direction is scanned with the second narrow antenna beam, thereby to carry out the second arrival direction estimation according to the BS-MUSIC. More specifically, in order to separate the peaks in the direction of the angle of 0° in FIG. 7 obtained by the first arrival direction estimation, the azimuth range of from about −10° to +10° is scanned with the second narrow beam five times so as to form five beams as shown in FIG. 8. In other words, the second estimation of arrival direction is carried out with the five narrow antenna beams. When the five antenna beams are used, it is theoretically possible to separate four arrival waves. However, the number for scanning with the second antenna beam is not limited to five, and the scanning may be carried out by any number. The number of antenna beams (number of scanning) may be the same for the first and second estimations. Alternatively, two antenna beams may be used for the second estimation. What is important is that the beam width of the second antenna beam is small.

Figure 9A:
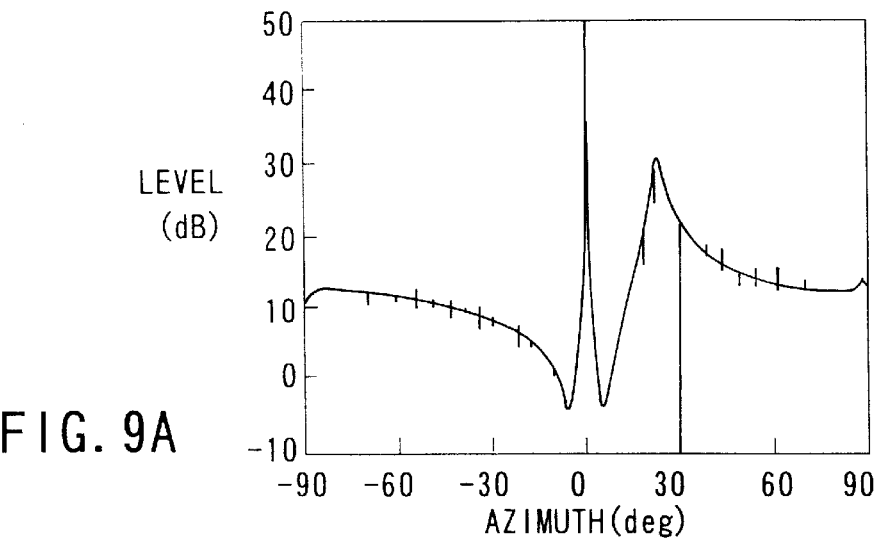
FIG. 9A is a diagram showing a result of the second estimation of wave arrival direction when the beam patterns shown in FIG. 8 are used.
Figure 9B:
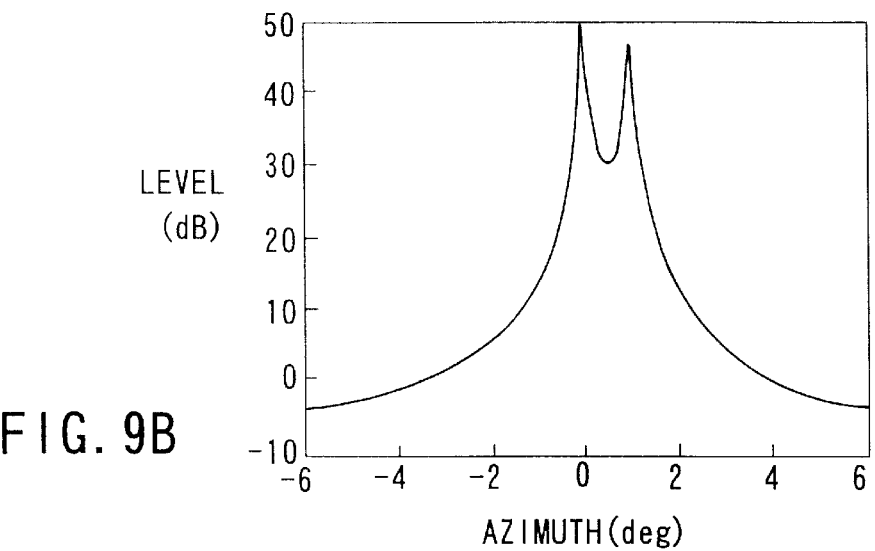
FIG. 9B is a partly enlarged diagram of FIG. 9A.

A result of the estimation in this case is shown in FIG. 9A. FIG. 9B is an enlarged diagram of the result of the estimation near the direction of 0° in FIG. 9A. From these diagrams, it can be known that the two arrival waves in the directions of 0° and 1° are correctly separated, and the arrival directions are estimated accurately.

As explained above, in the second estimation of arrival direction, it is possible to separate a plurality of arrival waves from near angles that cannot be separated in the first estimation of arrival direction. Further, as only five antenna beams are used in the second estimation of arrival direction, the number of data used may be smaller. Moreover, as the degree of the matrix is smaller in the second estimation, this substantially contributes to reducing the time required for the calculation.

In this case, it should be noted with care that although the estimation of arrival direction near 0° has been done accurately, the estimation of arrival direction in other areas has not been done accurately. As the arrival wave in the directions to which the antenna beam is not directed is received by the side lobes of the beams, this arrival wave is handled like noise. Therefore, it is necessary to carry out a similar processing for the arrival wave in other directions, in the manner as described below.

Figure 10:
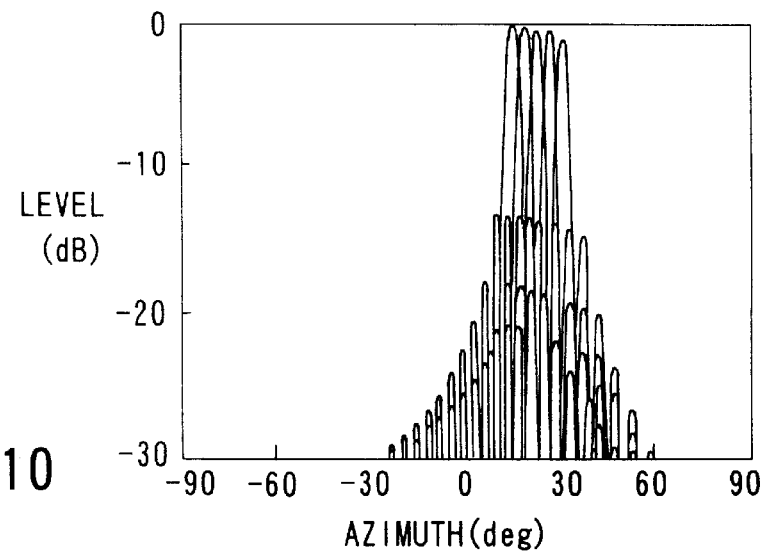
FIG. 10 is a diagram showing other beam patterns of antenna beams to be used in the second estimation of arrival direction in the first embodiment.

As it is known that a peak exists in the direction of +20° from the result of the first estimation of arrival direction, the azimuth range of from about +10° to +30° is scanned five times with the second narrow antenna beam, as shown in FIG. 10.

Figure 11A:
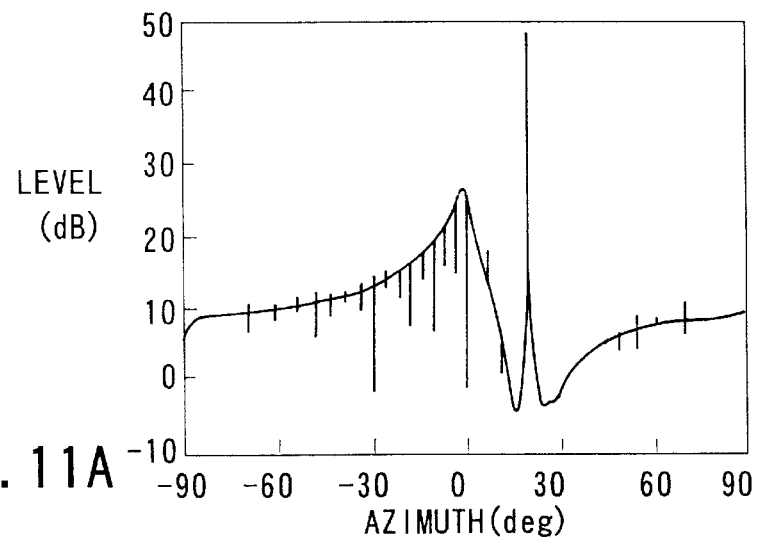
FIG. 11A is a diagram showing a result of the second estimation of wave arrival direction when the beam patterns shown in FIG. 10 are used.
Figure 11B:
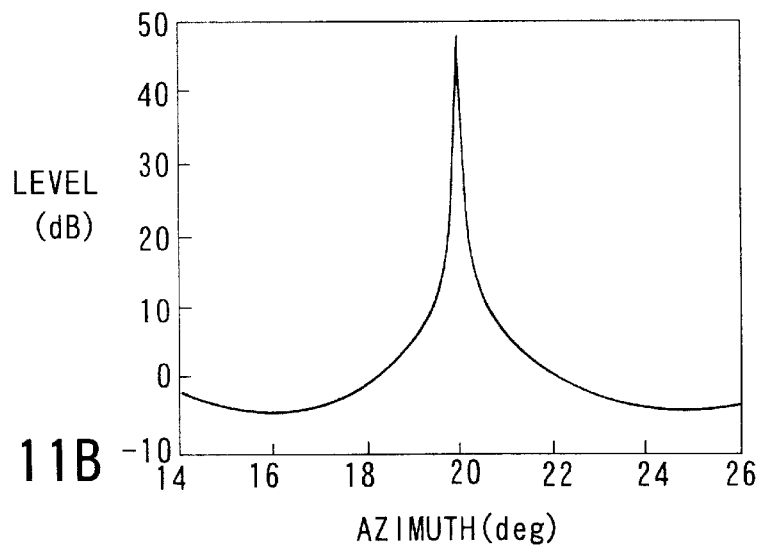
FIG. 11B is a partly enlarged diagram of FIG. 11A.

FIG. 11A shows a result of this estimation. FIG. 11B is an enlarged diagram of the result of estimation near the direction of +20° in FIG. 11A. From these diagrams, it is known that only one arrival wave exists in the direction of +20°, and that the arrival direction has been estimated correctly in the first estimation.

Figure 12:
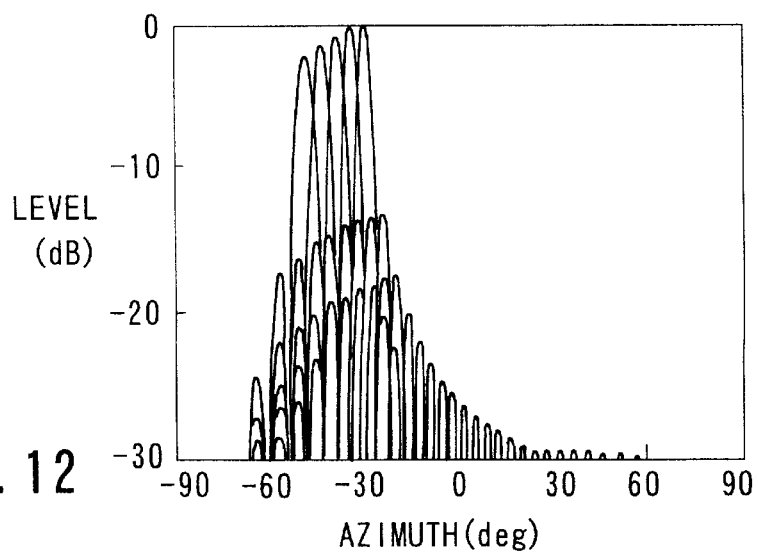
FIG. 12 is a diagram showing other beam patterns of antenna beams to be used in the second estimation of arrival direction in the first embodiment.

Next, as it is known that a peak also exists in the direction of −40° from the result of the first estimation of arrival direction, the azimuth range of from about −30° to −50° is scanned five times with the second narrow antenna beam, as shown in FIG. 12.

Figure 13A:
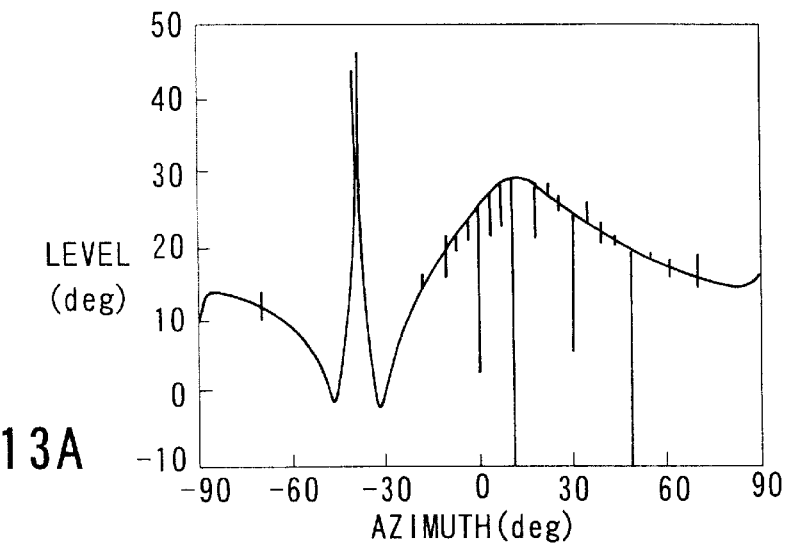
FIG. 13A is a diagram showing a result of the second estimation of wave arrival direction when the beam patterns shown in FIG. 12 are used.
Figure 13B:
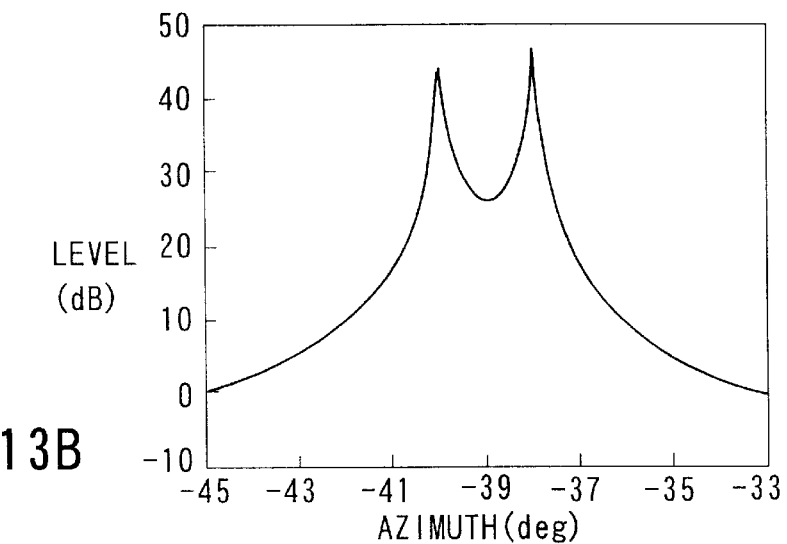
FIG. 13B is a partly enlarged diagram of FIG. 13A.

FIG. 13A shows a result of this estimation. FIG. 13B is an enlarged diagram of the result of estimation near the direction of −40° in FIG. 13A. From these diagrams, it is known that two arrival waves can be distinctly separated in the directions of −38° and −40°, and that the arrival directions have been estimated correctly.

As explained above, according to the first embodiment, it is possible to precisely estimate wave arrival direction in a short time and in a small volume of calculation, by carrying out a first rough estimation of a wide range with a wide antenna beam, and then by carrying out a second detailed estimation of arrival direction by scanning only the direction obtained by the first estimation, with a narrow antenna beam.

Advantages of estimation arrival direction in two stages are as follows. First, the number of data handled can be reduced. Second, the order of the matrix can be reduced. Accordingly, it is possible to substantially reduce the time required for the calculation. This effect will be described below based on a detailed example of values.

For the purpose of comparison, at first, there will be obtained the processing volume according to the prior-art method for estimating arrival direction by using all the antenna elements (32 elements). In the following investigation, it is assumed that the processing volume required for calculating an eigen value is proportional to the cube of the order of the matrix. For example, in the case of implementing the BS-MUSIC by forming 32 antenna beams, data is required by the number of 32 times the number of sampling. Also, as the size of the matrix is 32 times 32, the time required for calculating an eigen value is proportional to the cube of 32.

On the other hand, according to the present embodiment, the BS-MUSIC is implemented by forming seven antenna beams in the first estimation of arrival direction. Thus, data is required by the number of 7 times the number of sampling. Also, the size of the covariance matrix is 7 times 7. In the second estimation of arrival direction, the BS-MUSIC is implemented three times by forming five antenna beams. Thus, data is required by the number of 5 times the number of sampling times 3 (the number of implementation). Also, the size of the covariance matrix is 5 times 5. Therefore, the time required for calculating an eigen value is the sum of the time proportional to the cube of 7 and three times the time proportional to the cube of 5.

In other words, in comparing the numbers of data based on a simple comparison, data is required by the number of 32 times the number of sampling in the case of the prior-art example, and data is required by the number of 22 times the number of sampling in the case of the present embodiment. In comparing the processing volumes for calculating an eigen value, the time proportional to the cube of 32 (=32, 768) is required in the case of the prior-art example. In the case of the present embodiment, the time required is the sum of the time proportional to the cube of 7 (=343) and the three times the time proportional to the cube of 5 (=375), that is, the time proportional to 718. It is clear that the present embodiment requires a smaller number of data and a shorter time for calculating an eigen value, with an absolutely large effect of reduction in the calculation time.

In the above detailed example, it has been assumed that three arrival waves exist in the first estimation of arrival direction. However, when this number is smaller, the effect of the method of the present embodiment becomes much larger.

As explained above, according to the wave arrival direction estimating method of the first embodiment receiving an arrival wave by a plurality of antenna elements arrayed in a predetermined shape, inputting high-frequency signals obtained by this reception into one receiver, and estimating arrival direction of the arrival wave from reception signals generated, this method includes a first arrival direction estimation which estimates an arrival direction in a state that a first wide antenna beam is formed by a plurality of numbers, and a second arrival direction estimation which estimates an arrival direction in a state that a second antenna beam with a smaller width than the first antenna beam is formed by a plurality of numbers in a direction of a result of estimation by the first arrival direction estimation.

In other words, in the first arrival direction-estimation, a rough estimation is carried out by using a wide antenna beam radiated to plural directions by plural times. In the second arrival direction-estimation, an antenna beam with a smaller beam width is formed and radiated to directions of a result of the first estimation, thereby to carry out a precise estimation.

According to the above-described wave arrival direction estimating method, it is possible to estimate an arrival direction in a relatively simple hardware configuration using one receiver and in a small volume of calculation even under the unknown environment of waves. For example, in the BS-MUSIC, it is possible to estimate an arrival direction by using a small number of data and a small matrix.

Further, the antenna apparatus according to the present embodiment having a wave arrival direction estimating function includes a plurality of antenna elements arrayed in a predetermined shape, which receives an arrival wave and outputting high-frequency signals, a plurality of phase shifters for individually phase-shifting high-frequency signals output from the plurality of antenna elements, a selector for selecting antenna elements for receiving an arrival wave from the plurality of antenna elements, a signal synthesis circuit which synthesizes high-frequency signals phase-shifted by the phase shifters and sent from the antenna elements selected by the selector, a receiver which receives high-frequency signals output from the signal synthesis circuit and generates reception signals, an arrival direction estimation circuit which estimates an arrival direction of the wave based on the reception signals, and a controller which controls phase shift quantities of the phase shifters and a selection by the selector.

According to the antenna apparatus having the above-described structure, the arrival direction estimation circuit carries out a first estimation of arrival direction in a state that a part of a plurality of antenna elements are selected by the selector and a predetermined plurality of antenna beams are sequentially formed by controlling the phase shift quantity of the phase shifters. Next, the arrival direction estimation circuit carries out a second estimation of arrival direction in a state that all the plurality of antenna elements are selected by the selector and at least two antenna beams are sequentially formed by controlling the phase shift quantity of the phase shifters. With this arrangement, it is possible to carry out a precise estimation of arrival direction in a relatively simple hardware configuration using one receiver and in a small volume of calculation even under the unknown environment of wave.

Another embodiment of the present invention will be explained next. In the following embodiment, portions equivalent to those in the first embodiment will be attached with identical reference numerals and their detailed explanation will be omitted.

Second Embodiment

Figure 14:
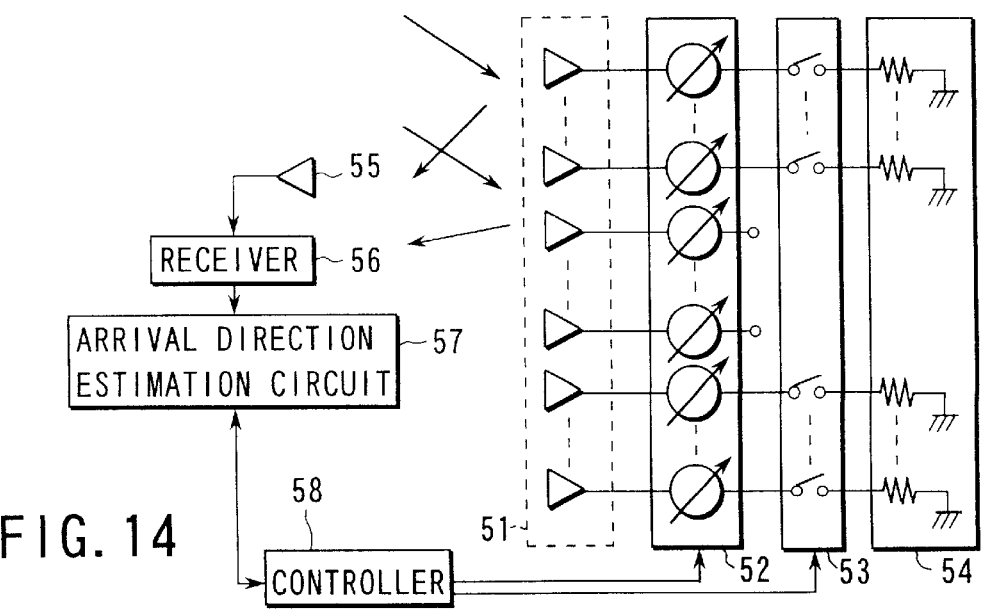
FIG. 14 is a block diagram showing a configuration of an antenna apparatus having a wave arrival direction estimating function according to a second embodiment of the present invention.

In the first embodiment, high-frequency signals from a plurality of antenna elements are synthesized into one signal by the synthesis circuit 14, and this signal is supplied to the receiver 15. However, in the second embodiment, the plurality of high-frequency signals are synthesized in space by using a reflection-type phased-array antenna. This will be explained below. FIG. 14 is a configuration diagram of an antenna apparatus having a wave arrival direction estimating function according to the second embodiment.

In FIG. 14, in a similar manner to that of the first embodiment, the antenna apparatus includes a plurality of antenna elements 51 arrayed in a predetermined shape, which receive arrival waves of the same frequency, variable phase shifters 52 individually connected to the corresponding antenna elements 51, which phase-shift high-frequency signals output from the corresponding antenna elements 51, and high-frequency switches 53 of which one ends are connected to the respective output terminals of the variable phase shifters 52.

In the second embodiment, a matched terminator 54 is connected to one end of each high-frequency switch 53. Further, in the present embodiment, a primary emission antenna (also called a primary emitter) 55 is further provided. An output from this primary emission antenna 55 is received by one receiver 56. An arrival direction estimation circuit 57 estimates a wave arrival direction based on the output from this receiver 56. A controller 58 controls the phase shifting quantities of the variable phase shifters 52, turning on/off of the high-frequency switches 53, and the operation of the arrival direction estimation circuit 57.

Next, there will be explained below the operation of the arrival direction estimation circuit when the reflection-type phased-array antennas of the present embodiment are used.

The antenna elements 51 receive a plurality of arrival waves. High-frequency signals output from the antenna elements 51 are phase-shifted by the variable phase shifters 52. The high-frequency signals phase-shifted by the variable phase shifters 52 are supplied to one ends of the high-frequency switches 53 selectively turned on/off and terminals. The high-frequency signals are reflected by the terminals.

Further, when the high-frequency switches 53 connected to the variable phase shifters 52 are off, the high-frequency signals output from the variable phase shifters 52 are reflected by the high-frequency switches 53 and are returned to the antenna elements 51. These returned high-frequency signals are re-transmitted as waves from the antenna elements 51. When the high-frequency switches 53 connected to the variable phase shifters 52 are on, the high-frequency signals output from the variable phase shifters 52 are attenuated by the matched terminators 54, and are not re-transmitted from the antenna elements 51. Therefore, the high-frequency switches 53 select the antenna elements 51 whose reception signals are not used for re-transmission. Some reception signals of some antenna elements 51 are always re-transmitted so that some variable phase shifters 52 are connected to the terminals without connected to the matched terminators 54 through the high-frequency switches 53.

The waves re-transmitted from the plurality of antenna elements 51 are synthesized while they are being propagated through the space, and are received as one wave by the primary emission antenna 55. A High-frequency signal output from the primary emission antenna 55 is input to the receiver 56. Then, the arrival direction estimation circuit 57 estimates a wave arrival direction based on the output from the receiver 56.

The antenna apparatus having a wave arrival direction estimating function according to the present embodiment is structured by using a reflection-type phased-array antenna, and includes a plurality of antenna elements arrayed in a predetermined shape, for receiving an arrival wave and outputting high-frequency signals, a plurality of phase shifters for individually phase-shifting high-frequency signals output from the plurality of antenna elements, reflectors for selectively reflecting some of the high-frequency signals phase-shifted by the phase shifters, thereby to re-transmit some of the signals as waves from the antenna elements, a primary emission antenna for receiving waves re-transmitted from the antenna elements and for outputting a high-frequency signal, a receiver for receiving the high-frequency signal output from the primary emission antenna and for generating a reception signal, an arrival direction estimation circuit for estimating an arrival direction of the wave based on the reception signals, and a controller for controlling phase shift quantities of the phase shifters and a selection by the selector.

According to the antenna apparatus having the above-described structure, the arrival direction estimation circuit carries out a first estimation of arrival direction in a state that a part of a plurality of antenna elements are selected by the selector and a predetermined plurality of antenna beams are formed by controlling the phase shift quantities of the phase shifters. Next, the arrival direction estimation circuit carries out a second estimation of arrival direction in a state that all the plurality of antenna elements are selected by the selector and at least two antenna beams are sequentially formed by controlling the phase shift quantities of the phase shifters. With this arrangement, it is possible to carry out a precise estimation of arrival direction in a relatively simple hardware configuration using one receiver and in a small volume of calculation even under the unknown environment of wave.

In the present embodiment, it is possible to change the number of the antenna elements 51 used for the re-transmission, by controlling the on/off of the high-frequency switches 53 by the controller 58. With this arrangement, in a similar to that of the first embodiment, it is possible to carry out a first rough estimation of arrival direction by using a small number of the antenna elements 51 at first, and then to carry out a second detailed estimation of arrival direction by using a large number of antenna elements 51 (for example, all the antenna elements) based on the result of the first estimation. Thus, it is possible to obtain similar effects to those of the first embodiment. Further, in the present embodiment, there is an advantage that there arises no attenuation of signals within the signal synthesis circuit 14, as the signal synthesis circuit 14 is not used unlike the first embodiment.

Third Embodiment

Figure 15:
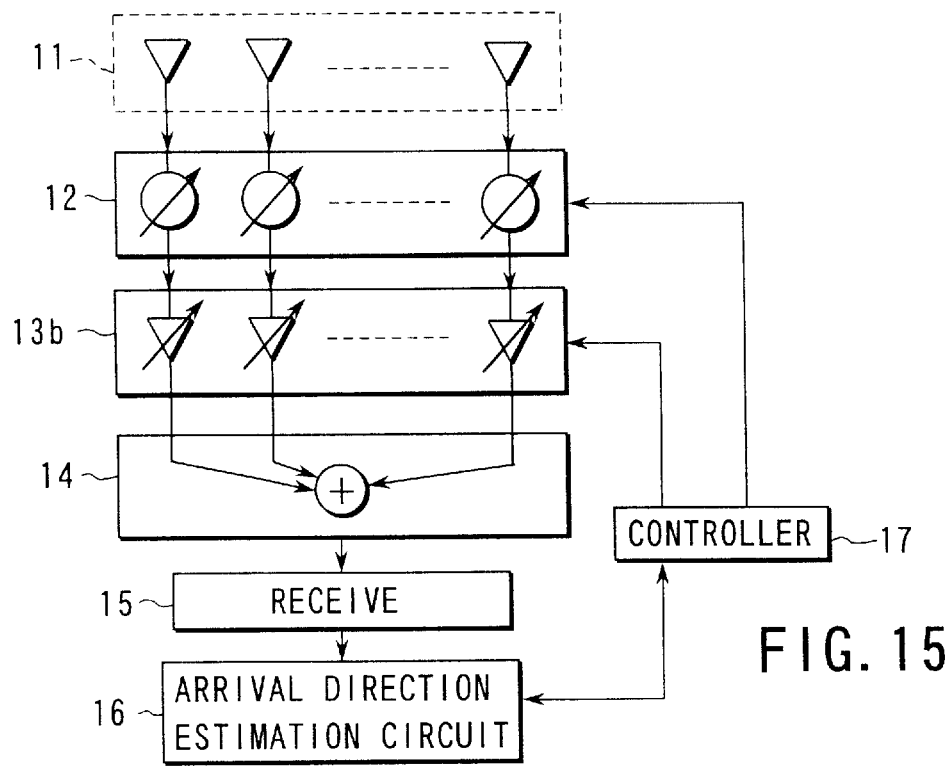
FIG. 15 is a block diagram showing a configuration of an antenna apparatus having a wave arrival direction estimating function according to a third embodiment of the present invention.

FIG. 15 is a configuration diagram of an antenna apparatus having a wave arrival direction estimating function according to the third embodiment of the present invention. This embodiment is a modification to the first embodiment, and is different from the first embodiment in only the point that the third embodiment uses variable gain amplifiers 13b in place of the high-frequency switches 13 shown in FIG. 3. Other constituent elements, such as the antenna elements 11, the variable phase shifters 12, the signal synthesis circuit 14, the receiver 15 and the arrival direction estimation circuit 16, are similar to those of the first embodiment. The controller 17 carries out the control of gains (amplification factor) of the variable gain amplifiers 13b, in addition to the control of the variable phase shifters 12 and the arrival direction estimation circuit 16.

Although not shown in FIG. 3, generally a low-noise amplifier (LNA) is installed at the output side of each antenna element in order to amplify weak high-frequency signals from the antenna elements. In the present embodiment, the variable gain amplifiers 13b are used as amplifiers for amplifying the high-frequency signals from the antenna elements 11. By selectively controlling the gains of the variable gain amplifiers 13b, the beam widths of the antenna beam is changed, thereby to carry out the first arrival direction estimation and the second arrival direction estimation by changing over the beam width, in a similar manner to the first embodiment.

More specifically, in the first estimation of wave arrival direction, only a part of the variable gain amplifiers 13b are operated, to form a wide antenna beam so that only a part of the antenna elements 11 are substantially used for the reception. In this case, it is also possible to form a wider antenna beam by combining the gains of the variable gain amplifiers 13b and the phase shift quantities of the variable phase shifters 12.

In the second estimation of arrival direction, it is possible to generate a narrow antenna beam to receive signals with all the antenna elements 11, by setting the gains of all the variable gain amplifiers 13b the same.

As explained above, according to the present embodiment, a beam width of the antenna beam is controlled by controlling the gains of the variable gain amplifiers 13b. Thus, it is possible to carry out a precise estimation of wave arrival direction in the procedures similar to those of the above embodiments. Accordingly, the high-frequency switches can be omitted, which leads to a reduction in the size of the apparatus. As the low-noise amplifiers originally installed at the output sides of the antenna elements are merely replaced with the variable gain amplifiers, the installation of the variable gain amplifiers does not lead to an increase in the circuit scale.

As a modification to the third embodiment, there will be considered a use of the variable gain amplifiers 13b in place of the high-frequency switches 53 of the second embodiment.

Fourth Embodiment

Figure 16:
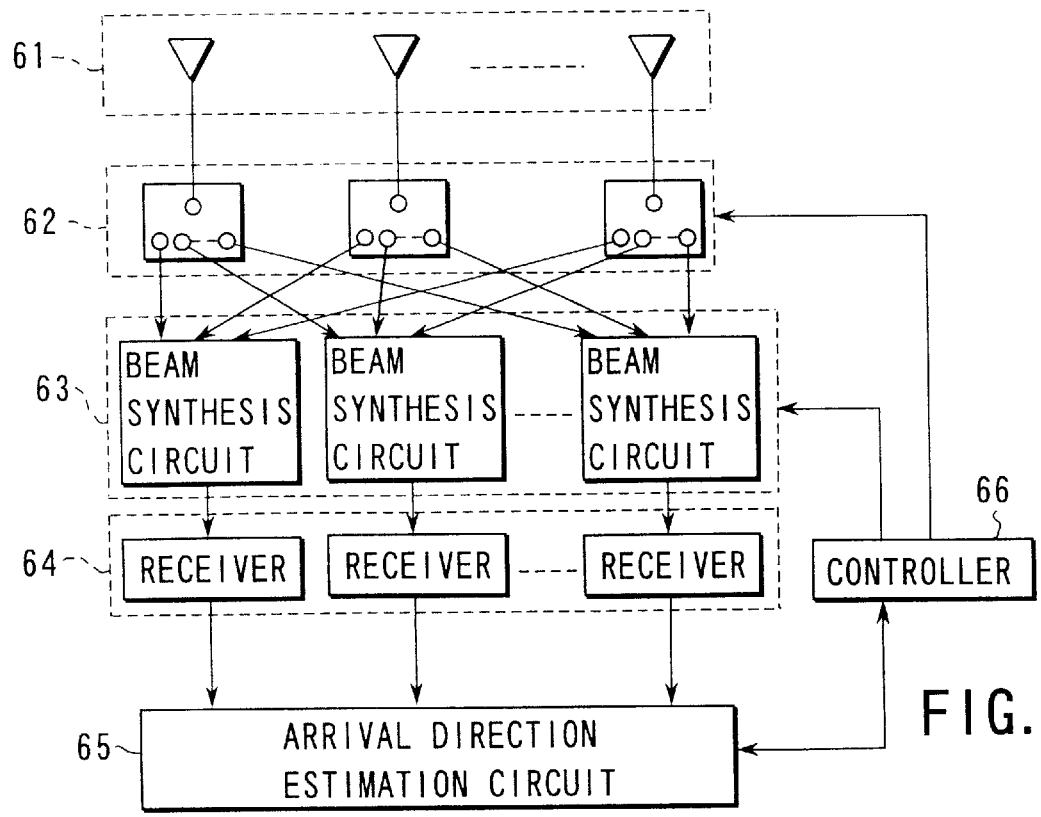
FIG. 16 is a block diagram showing a configuration of an antenna apparatus having a wave arrival direction estimating function according to a fourth embodiment of the present invention.

FIG. 16 is a diagram showing a configuration of an antenna apparatus having a wave arrival direction estimating function according to the present invention. This shows an example of the case where the real-time characteristic of calculation is improved by using a plurality of receivers.

The antenna apparatus is structured by a plurality of antenna elements 61 arrayed in a predetermined shape for receiving arrival waves of the same frequency, signal distributors 62 individually connected to all the antenna elements 61, a plurality of beam synthesis circuits 63, a plurality of receivers 64, a wave arrival direction estimation circuit 65, and a controller 66. The signal distributors 62 distribute a high-frequency signal from each of the antenna elements 61 to some of the beam synthesis circuits 63. Each of the beam synthesis circuits 63 is structured by, for example, the variable phase shifter (12 in FIG. 3), high-frequency switch (13 in FIG. 3) or variable gain amplifier (13b in FIG. 15), and signal synthesis circuit (14 in FIG. 3). An output from each beam synthesis circuit 63 is input to each receiver 64. The structures of the receiver 64 and afterwards are the same as those of the above-descried embodiments.

High-frequency signals output from the antenna elements 61 are distributed to the plurality of beam synthesis circuits 63 by the signal distributors 62 under the control of the controller 66. In each beam synthesis circuit 63, the phase shift quantity of the inside variable phase shifter or the on/off of the high-frequency switch is controlled by the controller 66 so that the antenna beam has a large beam width at the time of the first estimation of arrival direction and the antenna beam has a small beam width at the time of the second estimation of arrival direction.

The high-frequency signals synthesized by these beam synthesis circuits 63 are received by the respective receivers 64. Based on the outputs from these receivers 64, the arrival direction estimation circuit 65 carries out the first estimation of arrival direction and the second estimation of arrival direction in a similar manner to the preceding embodiments.

According to the present embodiment, as the apparatus is equipped with the plurality of receivers, it is possible to obtain reception signals based on a plurality of antenna beams at the same time. For example, when there are three receivers 64, it is possible to receive high-frequency signals based on three antenna beams at the same time. Therefore, as compared with the case where there is one receiver, the processing capacity increases by the multiple of the number of antenna beams formed at the same time. This substantially contributes to the improvement in real time characteristic. For example, in the case of the first embodiment, it is necessary to carry out scanning by 12 times in total (7+5=12) of the first and second estimations. However, in the present embodiment, it is necessary to carry out scanning by only five times in total, that is, three times for the first estimation and two times for the second estimation. Thus, there is an effect of reduction in time.

As the structure of the present embodiment requires a plurality of receivers 64, this is disadvantageous in costs. Therefore, the apparatus of the present embodiment is suitable for application to the case where real time characteristic is required rather than cost saving.

Fifth Embodiment

A fifth embodiment of the present invention will be described next. In the present embodiment, an arrival direction is estimated in three stages or more like "a first estimation of arrival direction"→"a second estimation of arrival direction"→, . . . , "an N-th estimation of arrival direction" (where N is an integer of 3 or above).

In the first estimation of arrival direction, there is a case where arrival directions cannot be estimated at all depending on conditions. For example, when there are seven beams and arrival directions are estimated by directing an antenna beam to all azimuth angles, there is a case where actually seven arrival waves exist at equal intervals from all azimuth angles. In this case, a result of estimation of arrival direction has no peak. As a result, there is a case where it is not possible to decide in which direction antenna beam is to be directed in the second estimation of arrival direction.

In this case, in the second estimation of arrival wave, it is necessary to slightly increase the number of antenna beams and to estimate an arrival direction in slightly higher resolution than in the case of the first estimation of arrival direction. With this arrangement, it is possible to estimate an arrival direction to some extent. Based on a third or a subsequent estimation of arrival direction, it becomes possible to precisely estimate an arrival direction.

The present invention is not limited to the above-described embodiments, and it is possible to implement the invention by appropriate modifications. For example, a plurality of embodiments, each explained as a single embodiment, may be suitably combined together. In other words, although the example of the reflection-type phased-array antenna in the second embodiment has been explained as a modification to the first embodiment, it is also possible to structure other embodiments similarly as reflection-type phased-array antenna. Further, although the example of using the variable gain amplifiers in place of the high-frequency switches in the third embodiment has been explained as a modification to the first embodiment, it is also possible to use the variable gain amplifiers in place of the high-frequency switches in other embodiments. Further, although the example of using the plurality of receivers in the fourth embodiment has been explained as a modification to the first embodiment, it is also possible to use a plurality of receivers in other embodiments.

Although description has been made of only azimuth as arrival direction, it is also possible to estimate two-dimensional arrival direction in a similar manner when the spread direction of beam is set in two-dimensional direction (azimuth plus elevation angle or wave angle). In this case, a cone beam having a two-dimensional spread may be used, or an arrival direction may be estimated two times for each one dimension.

The positional relationship between the variable phase shifters 12 and the high-frequency switches 13 in FIG. 3 may be opposite. Also, the positional relationship between the variable gain amplifiers 13b and the variable phase shifters 12 in FIG. 13 may be opposite.

As explained above, according to the present invention, as an arrival direction is estimated based on the BS-MUSIC using one receiver, for example, it is possible to carry out a high-precision estimating. Further, as the hardware configuration can be simplified, this is effective in reducing cost.

Further, by carrying out the first estimation of arrival direction using a wide antenna beam and by carrying out the second estimation of arrival direction using a narrow antenna beam based on the result of the first estimation, it is possible to precisely estimate an arrival direction while substantially reducing the calculation time even in the case of unknown environment of wave.

What is claimed is:

1. A wave arrival direction estimating method for receiving reception signals from a plurality of antenna elements with one receiver, and estimating arrival directions of electromagnetic waves based on antenna beams formed of the reception signals, the method comprises:

first estimation of arrival direction by using first antenna beams; and second estimation of arrival direction in detail by using second antenna beams each of which is narrower than each of the first antenna beams and directed to estimated directions by the first estimation.

2. The wave arrival direction estimating method according to claim 1, further comprising:

third estimation of arrival direction in further detail by using third antenna beams each of which is narrower than each of the second beams, and directed to estimated directions by the second estimation.

3. The wave arrival direction estimating method according to claim 1, wherein said first estimation is carried out by scanning the first antenna beams and said second estimation is carried out by scanning the second antenna beams.

4. The wave arrival direction estimating method according to claim 1, wherein said second estimation estimates plural arrival directions simultaneously.

5. The wave arrival direction estimating method according to claim 1, wherein said first antenna beams are formed of reception signals from a first number of antenna elements and said second antenna beams are formed of reception signals from a second number of antenna elements, the second number being larger than the first number.

6. An antenna apparatus comprising:

a plurality of antenna elements;

a plurality of phase shifters configured to individually shift phases of signals output from said plurality of antenna elements;

a selector configured to select some of said plurality of antenna elements;

a synthesis circuit configured to synthesize signals output from said plurality of antenna elements selected by said selector into a synthesis signal;

a receiver configured to receive the synthesis signal from said synthesis circuit;

an arrival direction estimation circuit configured to estimate arrival directions of electromagnetic waves based on antenna beams formed of a reception signal output from said receiver; and a controller configured to control phase shift quantities of said phase shifters and a selection operation of said selector, thereby to carry out two-stage estimation of arrival directions by sequentially using first antenna beams and then using second antenna beams each of which is narrower than each of the first antenna beams.

7. The antenna apparatus according to claim 6, wherein said controller controls said selector to select said some of the antenna elements thereby to form the first antenna beams, and controls the phase shift quantities of said phase shifters to carry out a first estimation of arrival directions by directing the first antenna beams to predetermined directions, and then, the controller controls said selector to select all of said plurality of antenna elements to form the second antenna beams, and controls the phase shift quantities of said phase shifters to carry out a second estimation of arrival directions by directing the second antenna beams to directions of a result of the first estimation of arrival direction.

8. The antenna apparatus according to claim 6, wherein said selector comprises high-frequency switches of a same number as said plurality of antenna elements, and the high-frequency switches are individually on-and-off controlled by said controller.

9. The antenna apparatus according to claim 6, wherein said selector comprises variable gain amplifiers of a same number as said plurality of antenna elements, and the variable gain amplifiers are individually on-and-off controlled by said controller.

10. The antenna apparatus according to claim 6, wherein said controller controls said selector to select a first number of antenna elements thereby to form the first antenna beams, and controls the phase shift quantities of said phase shifters to carry out a first estimation of arrival directions by directing the first antenna beams to predetermined directions, and then, the controller controls said selector to select a second number of antenna elements to form the second antenna beams, the second number being larger than the first number, and controls the phase shift quantities of said phase shifters to carry out a second estimation of arrival directions by directing the second antenna beams to directions of a result of the first estimation of arrival directions.

11. An antenna apparatus comprising:
a plurality of antenna elements configured to receive first electromagnetic waves;
a plurality of phase shifters configured to individually shift phases of signals output from said plurality of antenna elements;
a reflector configured to selectively reflect signals from some of said antenna elements and phase-shifted by said phase shifters so as to transmit second electromagnetic waves from said antenna elements;
a primary emission antenna configured to receive the second electromagnetic waves transmitted from said antenna elements;
a receiver configured to receive signals output from said primary emission antenna;
an arrival direction estimation circuit configured to estimate arrival directions of the first electromagnetic waves based on antenna beams formed of reception signals output from said receiver; and
a controller configured to control phase shift quantities of said phase shifters and a selective reflection operation of said reflector, thereby to carry out two-stage estimation of arrival directions by sequentially using first antenna beams and then using second antenna beams each of which is narrower than each of the first antenna beams.

12. The antenna apparatus according to claim 11, wherein said controller controls said reflector to select said some of the antenna elements thereby to form the first antenna beams, and controls the phase shift quantities of said phase shifters to carry out a first estimation of arrival directions by directing the first antenna beams to predetermined directions, and then, the controller controls said reflector to select all of said plurality of antenna elements to form the second antenna beams, and controls the phase shift quantities of said phase shifters to carry out a second estimation of arrival directions by directing the second antenna beams to directions of a result of the first estimation of arrival directions.

13. The antenna apparatus according to claim 11, wherein said reflector comprises high-frequency switches of a same number as said plurality of antenna elements, and the high-frequency switches are individually on-and-off controlled by said controller.

14. The antenna apparatus according to claim 11, wherein said reflector comprises variable gain amplifiers of a same number as said plurality of antenna elements, and the variable gain amplifiers are individually on-and-off controlled by said controller.

15. The antenna apparatus according to claim 11, wherein said controller controls said reflector to select a first number of antenna elements thereby to form the first antenna beams, and controls the phase shift quantities of said phase shifters to carry out a first estimation of arrival directions by directing the first antenna beams to predetermined directions, and then, the controller controls said reflector to select a second number of antenna elements to form the second antenna beams, the second number being larger than the first number, and controls the phase shift quantities of said phase shifters to carry out a second estimation of arrival directions by directing the second antenna beams to directions of a result of the first estimation of arrival directions.

16. An antenna apparatus comprising:
a plurality of antenna elements;
a plurality of distributors each configured to be supplied with a signal output from each of said plurality of antenna elements and have first to n-th output terminals;
n synthesis circuits configured to be commonly supplied with the first to n-th output signals of said plurality of distributors, each of the synthesis circuits comprising:
phase shifters configured to shift phases of signals output from said plurality of antenna elements, respectively;
a selector configured to select some of said plurality of antenna elements; and
a synthesizer configured to synthesize signals from said some of the antenna elements selected by said selector and phase-shifted by said phase shifters,
n receivers configured to be supplied with outputs of said signal synthesis circuits, respectively;
an arrival direction estimation circuit configured to estimate wave arrival directions based on antenna beams formed of reception signals output from said n receivers; and
a controller for controlling phase shift quantities of said phase shifters and a selection operation of said selector, thereby to carry out two-stage estimation of wave arrival directions by sequentially using first antenna beams and then using second antenna beams each of which is narrower than each of the first antenna beams.

17. The antenna apparatus according to claim 16, wherein said controller controls said selector to select said some of the antenna elements thereby to form the first antenna beams, and controls the phase shift quantities of said phase shifters to carry out a first estimation of arrival direction by directing the first antenna beams to a predetermined direction, and then, the controller controls said selector to select all of said plurality of antenna elements to form the second antenna beams, and controls the phase shift quantities of said phase shifters to carry out a second estimation of arrival direction by directing the second antenna beams to directions of a result of the first estimation of arrival direction.

18. The antenna apparatus according to claim 16, wherein said selector comprises high-frequency switches of a same number as said plurality of antenna elements, and the high-frequency switches are individually on-and-off controlled by said controller.

19. The antenna apparatus according to claim 16, wherein said selector comprises variable gain amplifiers of a same number as said plurality of antenna elements, and the variable gain amplifiers are individually on-and-off controlled by said controller.

20. The antenna apparatus according to claim 16, wherein said controller controls said selector to select a first number of antenna elements thereby to form the first antenna beams, and controls the phase shift quantities of said phase shifters to carry out a first estimation of arrival directions by directing the first antenna beams to predetermined directions, and then, the controller controls said selector to select a second number of antenna elements to form the second antenna beams, the second number being larger than the first number, and controls the phase shift quantities of said phase shifters to carry out a second estimation of arrival directions by directing the second antenna beams to directions of a result of the first estimation of arrival directions.

21. An antenna apparatus comprising:

antenna elements configured to receive electromagnetic waves and output reception signals;

a beam synthesis circuit configured to be supplied with the reception signals output from the antenna elements and form antenna beams;

an arrival direction estimation circuit configured to estimate arrival directions of the electromagnetic waves based on the antenna beams; and a controller configured to control the beam synthesis circuit to sequentially form first antenna beams and then second antenna beams each of which is narrower than each of the first antenna beams, thereby said arrival direction estimation circuit carrying out two-stage estimation of the arrival directions by sequentially using the first antenna beams and then using the second antenna beams.

22. The antenna apparatus according to claim 21, wherein said beam synthesis circuit selects a first number of reception signals from the reception signals thereby to form the first antenna beams, and select a second number of reception signals from the reception signals thereby to form the second antenna beams, the second number being larger than the first number.

* * * * *

UNITED STATES PATENT AND TRADEMARK OFFICE
CERTIFICATE OF CORRECTION

PATENT NO.   : 6,377,213 B1
DATED        : April 23, 2002
INVENTOR(S)  : Odachi et al.

It is certified that error appears in the above-identified patent and that said Letters Patent is hereby corrected as shown below:

<u>Title page,</u>
Item [73], the Assignee information should read:
-- [73]  Assignee:  Kabushiki Kaisha Toshiba,
                 Kawasaki-shi, (JP) --

Signed and Sealed this

Twenty-seventh Day of August, 2002

*Attest:*

*Attesting Officer*

JAMES E. ROGAN
*Director of the United States Patent and Trademark Office*